US007451229B2

(12) United States Patent
Klemets et al.

(10) Patent No.: US 7,451,229 B2
(45) Date of Patent: Nov. 11, 2008

(54) SYSTEM AND METHOD FOR EMBEDDING A STREAMING MEDIA FORMAT HEADER WITHIN A SESSION DESCRIPTION MESSAGE

(75) Inventors: Anders Klemets, Seattle, WA (US); Eduardo Oliveira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 10/178,705

(22) Filed: Jun. 24, 2002

(65) Prior Publication Data
US 2003/0236912 A1  Dec. 25, 2003

(51) Int. Cl.
G06F 15/16 (2006.01)
(52) U.S. Cl. .................. 709/236; 709/230; 709/204; 709/217; 709/231; 715/751; 370/389
(58) Field of Classification Search .......... 709/230, 709/236, 204, 217, 231; 715/751; 370/389
See application file for complete search history.

(56) References Cited

U.S. PATENT DOCUMENTS

| 6,041,345 A | 3/2000 | Levi et al. ............ 709/217 |
| 6,205,140 B1* | 3/2001 | Putzolu et al. ........ 370/389 |
| 6,643,652 B2* | 11/2003 | Helgeson et al. ...... 707/10 |
| 6,792,449 B2* | 9/2004 | Colville et al. ........ 709/215 |
| 6,829,648 B1* | 12/2004 | Jones et al. ........... 709/230 |
| 6,857,130 B2* | 2/2005 | Srikantan et al. ...... 725/93 |
| 2001/0016869 A1 | 8/2001 | Baumeister et al. |
| 2002/0016969 A1 | 2/2002 | Kimble |
| 2002/0039149 A1* | 4/2002 | Perez ..................... 348/469 |
| 2002/0138619 A1 | 9/2002 | Ramaley et al. |
| 2003/0120928 A1 | 6/2003 | Cato et al. |
| 2005/0081159 A1 | 4/2005 | Gupta et al. |
| 2006/0090030 A1 | 4/2006 | Ijdens et al. |

OTHER PUBLICATIONS

Rehm, "Representing Internet Streaming Media Metadata Using MPEG-7 Multimedia Description Schemes," International Multimedia Conference, Proceedings of the 2000 ACM Workshops on Multimedia, 2000, pp. 93-98, ACM Press, New York, U.S.A.
Page et al., "It's About Time: Link Streams as Continuous Metadata," Conference on Hypertext and Hypermedia, Proceedings of the Twelfth ACM Conference on Hypertext and Hypermedia, 2001, pp. 93-102, ACM Press, New York, U.S.A.

(Continued)

Primary Examiner—Nathan Flynn
Assistant Examiner—Kyung H Shin
(74) Attorney, Agent, or Firm—Merchant & Gould, P.C.

(57) ABSTRACT

A system and method for embedding a streaming media format header within a session description message. The streaming media format header is encapsulated within a session description message as a header attribute. The streaming media format header describes complex relationships between available media streams. The session description message also includes a list of content description attributes storing metadata about the media streams. A media description field in the session description message stores a stream attribute identifying a media stream associated with the media description field.

23 Claims, 4 Drawing Sheets

OTHER PUBLICATIONS

Handley et al., "SDP: Session Description Protocol," Network Working Group, Request for Comments: 2327, The Internet Society, Apr. 1998, 40 pages, U.S.A.

Schulzrinne et al., "Real Time Streaming Protocol (RTSP)," Network Working Group, Request for Comments: 2326, The Internet Society, Apr. 1998, 86 pages, U.S.A.

Schulzrinne et al., "RTP: A Transport Protocol for Real-Time Applications," Network Working Group, Request for Comments: 1889, Jan. 1996, 75 pages, U.S.A.

Masinter, "The 'Data' URL Scheme," Network Working Group, Request for Comments: 2397, The Internet Society, Aug. 1998, 5 pages, U.S.A.

Alvestrand, "Tags for the Identification of Languages," Network Working Group, Request for Comments: 1766, Mar. 1995, 9 pages, U.S.A.

Yergeau, "UTF-8, A Transformation Format of ISO 10646," Network Working Group, Request for Comments: 2279, The Internet Society, Jan. 1998, 10 pages, U.S.A.

* cited by examiner

FIGURE 5

SYSTEM AND METHOD FOR EMBEDDING A STREAMING MEDIA FORMAT HEADER WITHIN A SESSION DESCRIPTION MESSAGE

NOTICE

Information in this document, including uniform resource locator and other Internet Web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

TECHNICAL FIELD

The present invention relates to the field of streaming media. In particular, this invention relates to a system and method for embedding a streaming media format header within a session description message describing content in a streaming media session.

BACKGROUND OF THE INVENTION

Content streaming, such as the streaming of audio, video, text, or other media, indicates that data representing the content is provided over a network to a client computer on an as-needed basis rather than being pre-delivered in its entirety before playback. Thus, the client computer renders streaming data as it is received from a network server, rather than waiting for an entire file to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet. Content streaming can be implemented with one or more protocols.

For example, the Real-time Transport Protocol (RTP), as described in the Internet Engineering Task Force (IETF) RFC 1889, the entire disclosure of which is incorporated herein by reference, provides end-to-end network transport functions suitable for applications transmitting real-time data, such as audio, video or simulation data, over multicast or unicast network services. RTP does not address resource reservation and does not guarantee quality-of-service for real-time services. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers.

In addition, the Real-time Streaming Protocol (RTSP), as described in the IETF RFC 2326, the entire disclosure of which is incorporated herein by reference, is an application-level protocol for control of the delivery of data with real-time properties. RTSP provides an extensible framework to enable controlled, on-demand delivery of real-time data, such as audio and video. Sources of data can include both live data feeds and stored clips. This protocol is intended to control multiple data delivery sessions, provide a means for choosing delivery channels such as user datagram protocol (UDP), multicast UDP and transmission control protocol (TCP), and provide a means for choosing delivery mechanisms based upon RTP.

Further, the Session Description Protocol (SDP), as described in the IETF RFC 2327, the entire disclosure of which is incorporated herein by reference, is an application level protocol intended for describing multimedia sessions for the purposes of session announcement, session invitation, and other forms of multimedia session initiation. SDP can be used in conjunction with RTSP to describe and negotiate properties of the multimedia session used for delivery of real-time data.

A multimedia encoder can capture real-time audio and video data and represent the captured data as multiple streams. For example, audio is typically represented as one stream and video as another. Complex files can have multiple streams, some of which may be mutually exclusive. RTSP specifies a mechanism by which a client can ask a server to deliver one or more of the encoded media streams. RTSP also provides a way for the client to obtain information about the contents of the multimedia presentation via SDP message format prior to delivery of the multimedia. SDP enumerates the available media streams and lists a limited set of auxiliary information ("SDP metadata") that is associated with the collection of streams.

However, SDP is not able to express complex relationships between streams in part because SDP only defines a limited set of SDP metadata items. In addition, SDP does not have a notion of mutually exclusive streams. For example, SDP lacks support for specifying SDP metadata in multiple languages in a single SDP message. As such, SDP fails to adequately describe content encoded in certain formats.

For example, some multimedia encoders capture real-time audio and video data and save the content as advanced streaming format (ASF) file (also referred to as active streaming format or advanced system format) as disclosed in U.S. Pat. No. 6,041,345. ASF is a file format specification for streaming multimedia files containing text, graphics, sound, video, and animation. An ASF file has objects including a header object containing information about the file, a data object containing the media streams (i.e., the captured audio and video data), and an optional index object that can help support random access to data within the file. The header object of an ASF file stores information as metadata that is needed by a client to decode and render the captured data. The list of streams and their relationships to each other is also stored in the header object of the ASF file. Some of the metadata items may be mutually exclusive because the metadata items describe the same information using different spoken languages. SDP fails to adequately describe content encoded in ASF.

For these reasons, a system and method for embedding a streaming media format header within a session description message describing content in a streaming media session is desired to address one or more of these and other disadvantages.

SUMMARY OF THE INVENTION

The invention provides for embedding a streaming media format header within a session description message describing content having a plurality of media streams in a streaming media session. In particular, the invention includes software with data structures for encapsulating and embedding the streaming media format header within the session description message. In addition, the invention software embeds a list of content descriptions attributes storing metadata about the media streams within the session description message. A media description field in the session description message stores a stream attribute identifying a media stream associated with the media description field.

The invention extends the functionality of the session description message by embedding the streaming media format header and a representation of metadata inside the message. With the invention, the client is provided access to the entire header within the message. As a result, if an encoder extends the header with additional information, the new extensions will be conveyed by the server even if the server itself does not understand the header extensions. In addition, new metadata items can be introduced without having to define a new extension to the session description message because the collection of metadata items is treated as a single unit. Further, a simple client or intermediate device (such as a proxy server) that does not understand the header or the metadata will still be able to understand the remainder of the message. That is, the invention is backwards-compatible with devices that do not implement this invention. The invention allows the use of a standards-based protocol such as RTSP without sacrificing any of the functionality supported by the streaming media format.

In accordance with one aspect of the invention, one or more data fields are encoded in a data signal for transmission over a communications channel. The data fields include content encoded in a streaming media format. The streaming media format includes a header. The data fields further include the header encapsulated therein.

In accordance with another aspect of the invention, a method streams content encoded in a streaming media format to at least one client as one or more media streams via a streaming protocol. The streaming media format has a header including one or more stream identifiers. Each of the stream identifiers corresponds to at least one of the media streams. The method includes receiving a description request from the client to describe the content. The method also includes transmitting a description message via a description protocol to the client in response to the received description request. The description message includes the header encapsulated therein. The method also includes receiving at least one of the stream identifiers from the client. The received stream identifiers correspond to the media streams selected by the client for rendering. The method further includes delivering the selected media streams to the client via the streaming protocol in response to the received stream identifiers.

In accordance with yet another aspect of the invention, a method receives content streamed from a server via a streaming protocol as one or more media streams. The content is encoded in a streaming media format having a header with one or more stream identifiers. Each of the stream identifiers corresponds to at least one of the media streams. The method includes transmitting a description request to the server for a description of the content. The method also includes receiving a description message from the server via a description protocol in response to the transmitted description request. The description message includes the header encapsulated therein. The method further includes selecting one or more of the media streams for rendering and transmitting the stream identifiers corresponding to the selected media streams to the server to notify the server of the selected media streams. The method further includes requesting delivery of the selected media streams from the server via the streaming protocol, receiving the delivered, selected media streams, and rendering the media streams.

In accordance with yet another aspect of the invention, one or more computer-readable media store a data structure representing a description message transmitted by a server to at least one client via a description protocol to describe content encoded in a streaming media format as one or more media streams. The streaming media format includes a header. The data structure includes a session description field and one or more media description fields. The session description field stores a header attribute wherein a value for the header attribute represents an encapsulation of the streaming media format header. Each of the media description fields stores information specific to one or more of the media streams.

In accordance with yet another aspect of the invention, a method encapsulates data into a description message. The description message is transmitted by a server to at least one client via a description protocol. The description message describes content encoded in a streaming media format for streaming via a streaming protocol. The method includes generating a serialized representation of the data and converting the serialized representation into a character string.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The invention includes software and data structures for embedding a streaming media format header within a session description message describing content having a plurality of media streams in a streaming media session. In particular, the invention includes software that encapsulates and embeds the streaming media format header within a session description field of the session description message. Encapsulating the header treats the collection of structured information within the header as a whole without affecting or taking notice of its internal structure. In addition, the invention software embeds a list of content descriptions attributes storing metadata about the media streams within the session description message. A media description field in the session description message stores a stream attribute identifying a media stream associated with the media description field. The data fields of the session description message are encoded within a data signal according to various protocols including, but not limited to, a real-time streaming protocol (RTSP), a session description protocol (SDP), and a real-time transport protocol (RTP) for delivery over a communications channel. The communications channel may be any data communication network such as described with reference to FIG. 6. In one embodiment, transmission of the media streams is controlled by RTSP while the media streams are transmitted using RTP.

Figure 1:
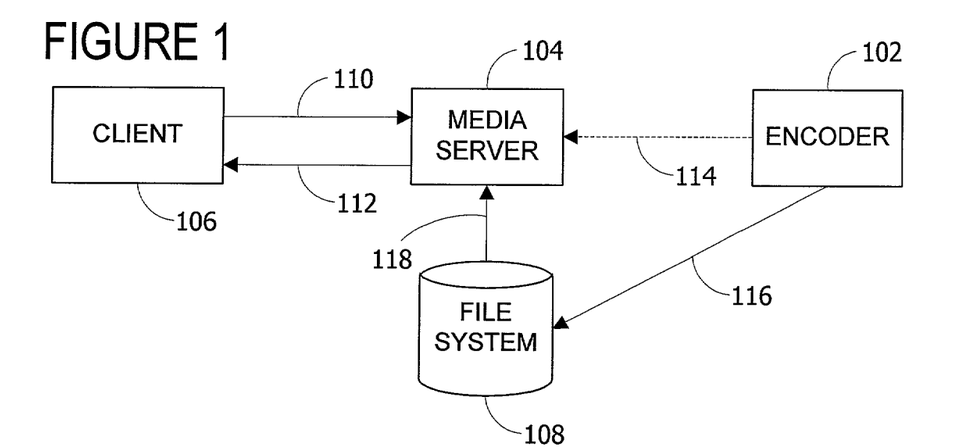
FIG. 1 is an exemplary block diagram illustrating a streaming media scenario.

The invention is operable in a system that includes an optional encoder 102, a media server 104, and a client 106 as shown in FIG. 1. The media server 104 is the first server the content flows through on the way to the client 106. The media server 104 generally receives content from either a file system 108 at 118 or a feed from the encoder 102 at 114 (optional). If the media server 104 receives content from the encoder 102, the file system 108 may be bypassed, or the encoded content may be concurrently stored in the file system 108. In an alternative embodiment (not shown), one or more downstream servers generally receive data from the media server 104. In complex distribution scenarios involving multiple levels of servers, the downstream servers may receive and forward content from another server that is sourcing content from the media server 104. Since the data flows from the media server 104 to the client 106, a server is considered downstream from previous servers. The last server in a distribution scenario that is downstream from all other servers in the distribution chain is intended to have direct client communications. In the simplified embodiment of FIG. 1, the media server 104 communicates directly with the client 106, possibly via a network such as described with reference to FIG. 6.

FIG. 1 illustrates the architecture of the system in which the invention operates and also describes the sequence of steps involved in an exemplary unicast streaming operation over a real-time streaming protocol (RTSP) with a session description protocol (SDP). Those skilled in the art will appreciate that the invention is not limited to the exemplary block diagram or protocols of FIG. 1. Instead, it is contemplated by the inventors that the software and data structures of the invention are operable in various other client-server streaming media scenarios using any streaming media format and any protocol.

At 110, the client 106 sends an RTSP DESCRIBE request to the media server 104. At 112, the server 104 responds to the RTSP DESCRIBE request with an SDP message. The SDP message includes the streaming media format file header and the content description list. Clients usually retrieve at least one RTSP uniform resource locator (URL) for streaming content from an SDP record retrieved from the server 104 by means of a DESCRIBE request. The URL may also be retrieved by other mechanisms, such as from the command line or from a file. An example RTSP URL is rtsp://MyServer.MyDomain.com/foo.asf.

The server 104 challenges the client 106 when the client 106 issues a DESCRIBE request and may re-authenticate during any subsequent exchange; the authentication related exchange of information takes place before going further. If the authentication fails, the client 106 may retry a number of times before abandoning the request. The client 106 retrieves the various properties of the session such as an identifier uniquely identifying the content (e.g., via a globally unique identifier (GUID) for the SDP record) and all URLs for the session. There may be more than one URL specified in the SDP record if, for example, there is a separate URL for a video stream and one for it s associated audio stream. The client 106 initiates a connection to the server 104 using a RTSP SETUP command. The number of SETUP messages sent by the client 106 depends on the number of stream URL's in the announcement record (one per RTSP stream URL). The client 106 is also free to choose which streams it wants to SETUP (i.e., receive from the server 104). The client 106 does not have to SETUP all available streams. For example, there may be multiple available video streams encoded at different bit rates (i.e., with different quality) and the client 106 may choose which one to receive. In addition or in alternative, the client 106 may not choose any video at all, and SETUP only audio instead. The server 104 responds to the SETUP request validating the client request. The response contains the various transport level parameters and the session identifier for the session. The session identifier is used by the client 106 in any subsequent communications regarding this exchange with the server 104. In subsequent streaming operations the client 106 will use the transport parameters for this session in order to access server ports for data flows, retransmissions etc.

At 114, the encoder 102 streams the streaming media format content in real-time to the server 104. The media server 104 may read metadata items at 118 from the file system 108. In another embodiment at 116, the encoder 102 creates a streaming media format file which is stored on the file system 108 that is accessible to the media server 104. The media server 104 reads the streaming media format file from the file system 108 at 118 and may read, in addition, metadata items from a separate file which are used to create and embed the content description list in the session description message.

Encoder Operations

Figure 2:
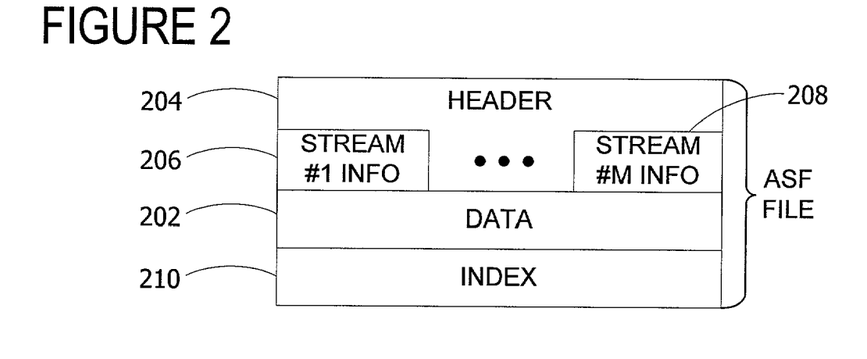
FIG. 2 is an exemplary block diagram illustrating the structure of an advanced streaming format file.

The encoder 102 creates a streaming media format file that stores real-time media content such as audio and video. For example, the streaming media format may be an advanced streaming format (ASF) such as illustrated in FIG. 2 (also referred to as active streaming format or advanced system format). In FIG. 2, audio and video data are stored as separate media streams in the file in a data field 202. Each stream is assigned a stream identifier such as a number. In one embodiment of ASF, stream identifiers are integer numbers in the range 1 to 63 inclusive. The streaming media format has a header field 204 listing the stream identifiers and information about each stream. For example, the header field 204 may include stream #1 information 206 through stream #M information 208. Each stream identifier corresponds to one of the media streams. The header field 204 stores metadata for each stream, such as the encoded bit rate and the language (if applicable). The ASF file in FIG. 2 also has an optional index field 210.

The streaming media format file may contain multiple mutually exclusive representations of the same content. For example, the file may contain multiple audio streams, each in a different spoken language or differing in other aspects, or there may be multiple video streams, each encoded using a different bit rate. In addition, the audio streams may be encoded using different bit rates. The encoder 102 creates a streaming media format file that is stored on a computer-readable medium such as file system 108, but it is also possible for the encoder 102 to stream the file in real-time to a streaming media server 104 without storing the content on the file system 108.

Server Operations

The streaming media server 104 reads a streaming media format file from a computer-readable medium, or streams it in real-time from another server or the encoder 102. Metadata items such as "Title" and "Author" may be associated with the streaming media format file. The metadata can originate from different sources. Some metadata items may be stored in the streaming media format file header (e.g., header field 204), while other metadata items are either obtained from a separate file or generated dynamically by the server 104. The collection of metadata is referred to as a content description list. Each content description in this list contains metadata items for a specific language.

When the server 104 streams a file to the client 106, it may override some of the metadata items defined in the streaming media format file header (e.g., header field 204) with information dynamically generated or obtained from separate files. This allows the administrator of the server 104 to deliver modified or updated metadata to the client 106 without modifying the streaming media format file header. One example of such a separate file that overrides an attribute of the streaming media format file header is the playlist below. This playlist instructs the server 104 to stream the streaming media format file called "presentation.wmv" and specifies a metadata attribute called "Title" that overrides any "Title" attribute that is found in the header of the file for use with a streaming media player:

```
<SMIL>
    <media src="presentation.wmv" >
        <CLIENTDATA Title="Streaming over RTSP" />
    </media>
</SMIL>
```

The flow between the client 106 and the server 104 in FIG. 1 is illustrated in greater detail with reference to FIG. 3.

Figure 3:
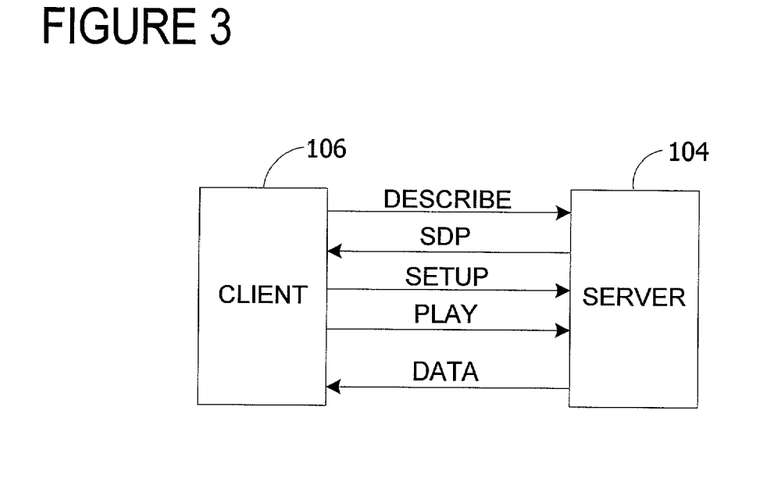
FIG. 3 is an exemplary flow diagram illustrating the interaction between the client and the server to initiate a streaming media session.

Referring next to FIG. 3, an exemplary flow diagram illustrates the interaction between the client 106 and the server 104 to initiate a streaming media session. In the exemplary embodiment of FIG. 3, the server 104 implements RTSP. RTSP allows the client 106 to request the delivery of a subset of the streams in the file. The client 106 sends a description request (e.g., an RTSP DESCRIBE request) to the server 104 to describe the available content. When the server 104 receives a RTSP DESCRIBE request, the server 104 responds by encapsulating the streaming media format header within a description message (e.g., an SDP message) and transmitting the description message via a description protocol (e.g., SDP) to the client 106. In RTSP (as defined in RFC 2326), the description message is referred to as a presentation description. The header is inserted in the description message in such a way that it is ignored by clients that do not have logic to understand the header (see FIG. 4). Other information such as the content description list is also included in the session description message (see FIG. 4). The SDP message lists each stream that is contained in the streaming media format file. SDP establishes a separate URL for each stream. In one embodiment, the stream URL is considered to be a stream identifier. In other embodiments, the stream identifier is an integer. The stream URL can be used by the client 106 to request delivery of the stream via a playback request (e.g., using the RTSP "SETUP" request). For each such URL, the SDP message also specifies the corresponding streaming media format stream identifier. This establishes a one-to-one mapping between the stream URL and the stream identifier.

The content description list is also inserted in the description message (see FIG. 4) in such a way that it will be ignored by clients that do not have the logic to understand it. See Appendix A for excerpts from an SDP content description that are returned to the client 106 in response to a DESCRIBE request. The SDP description message indicates the URL that should be used with RTSP commands that operate on the presentation as a whole, as opposed to individual streams. Examples of such commands include PLAY and PAUSE. In addition, the SDP description message indicates URLs for audio and video streams and associated standard and dynamic streams.

Client Operations

In the exemplary RTSP embodiment, the client 106 connects to the server 104 using RTSP based on an initial URL. The client 106 sends the description request (e.g., RTSP DESCRIBE) after connecting to the server 104. The server 104 responds with the presentation description (e.g., the SDP message) or other session description message that includes the streaming media format file header and the content description list. The client 106 may send an RTSP request to dynamically measure the connection bandwidth to the server 104. In another embodiment, the connection bandwidth has been manually specified at the client 106 in which case the client 106 will bypass these requests. The client 106 examines the streaming media format file header to decide which streams it wants to select. Several factors influence the client's selection of the streams including, but not limited to, the connection bandwidth and the user's language. For example, if the client 106 is unable to display video, only an audio stream may be selected.

In the streaming media format file header, each stream is represented by its stream identifier. Hence, the result of the selection process is a list of stream identifiers for the streams that were chosen. The description message provides a mapping from each stream identifier to a URL. Using this mapping, the client 106 sends a playback request (e.g., an RTSP SETUP request) for each stream that the client 106 has chosen. The client 106 also selects a content description from the content description list that relate to the selected media streams. For example, the client 106 may select a content description that most closely matches a user's language preference to display certain metadata items from that list in a user interface for the user. Alternatively or in addition, the client 106 specifies a desired language in an Accept-Language header that the client 106 includes in the DESCRIBE request. The server 104 selects the content description that most closely matches the requested language, and includes the chosen content description in the SDP message sent to the client 106. The client 106 may issue a separate RTSP PLAY request for each stream that has been chosen to initiate delivery of the chosen streams. Alternatively, the play request is included with the playback request with the selected stream identifiers. That is, the client 106 may send a separate PLAY command for each stream that has been selected, if the server 104 supports this type of PLAY command. Alternatively, the client 106 may send a PLAY request using the URL that controls the presentation as a whole. This starts playback of all the selected streams. In response to the playback request, the client 106 receives the selected streams (e.g., via RTP) from the server 104 and renders or otherwise processes the received streams in the UI for the user. For example, the client player UI may render video, audio, text, and/or animations.

SDP and the Streaming Media Format File Header

Figure 4:
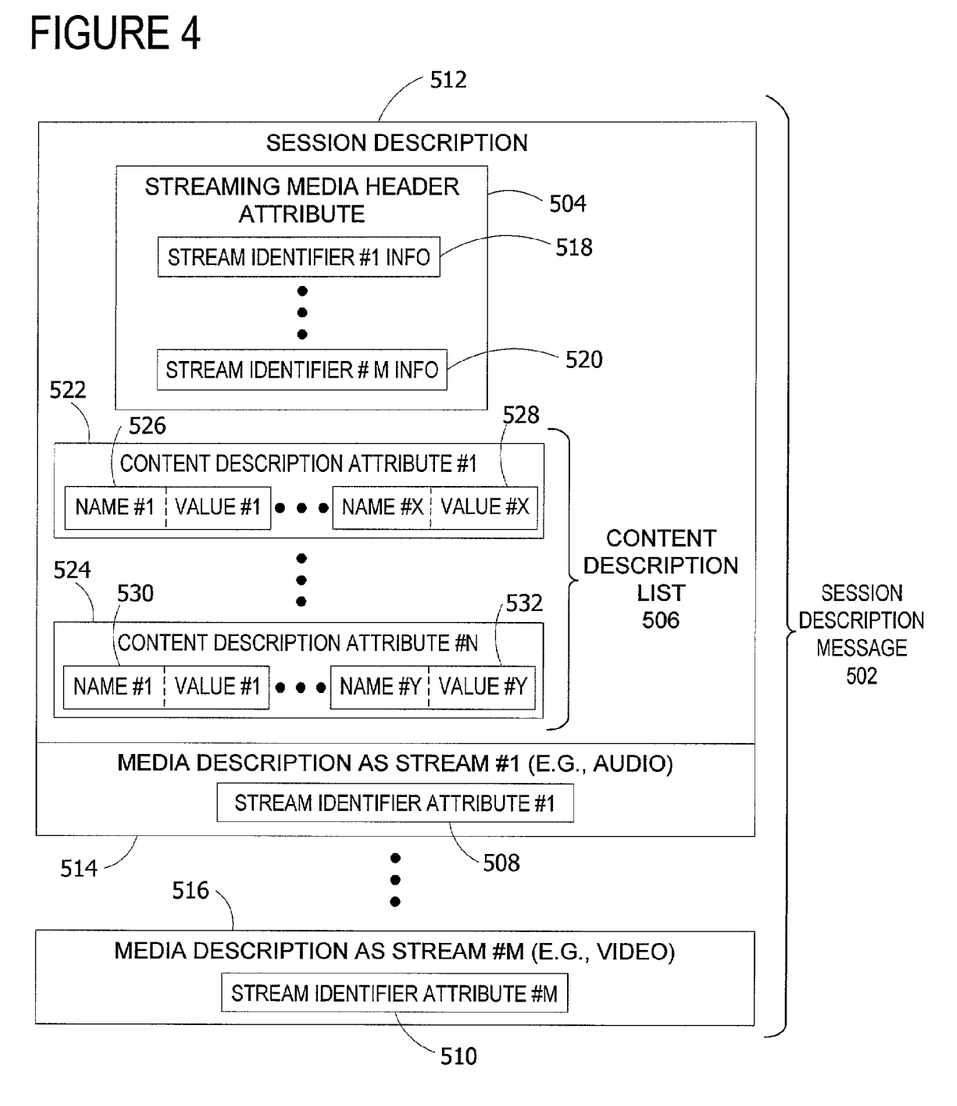
FIG. 4 is an exemplary block diagram illustrating the structure of a session description protocol message.

Referring next to FIG. 4, an exemplary block diagram illustrates the structure of a session description message 502 or a presentation description or the like. Those skilled in the art will appreciate that the exemplary data structure of the session description message 502 described with reference to FIG. 4 is merely exemplary. It is contemplated by the inventors that a header attribute 504, a content description list 506, and/or stream identifier attributes 508, 510 maybe stored in various fields of the session description message 502 and in any order not specifically described herein. In addition, it is contemplated by the inventors that the invention software and data structures are operable with any session description message 502, protocol, or format and not specifically limited to SDP or any other format or protocol.

The description message 502 includes with a session description section or field 512, followed by one or more media description sections or fields 514, 516 such as media description field #1 through media description field #M. The session description field 512 provides information pertaining to all streams, while each media description field 514, 516 provides information that is specific to a particular stream. The session description field 512 stores a header attribute 504 such that a value for the header attribute 504 represents an encapsulation of a streaming media format header such as header 204 illustrated in FIG. 2. The header attribute 504 stores, for example, stream identifier information 518, 520 such as stream identifier #1 information through stream identifier #M information. In one embodiment, the value for the header attribute 504 represents an encapsulation of the streaming media format header as a uniform resource locator (URL). In the SDP embodiment, the header attribute 504 is identified by the SDP directive "a=" which can be used to extend the message format. However, while SDP is an ASCII-based message format, the streaming media format header may be binary, so the header is encoded into a subset of characters that can be safely used with SDP (see FIG. 5 below).

In one embodiment, the streaming media format file header is encoded as a data URL. Typically, URLs refer to content that it stored at a remote location. However, in the case of a data URL, the content is stored inside the URL itself. The specification for the data URL allows arbitrary binary data to be included, if Base64 encoding is used to encode the binary data into a subset of the US-ASCII character set. In addition, the header attribute 504 comprises a type tag identifying the value as representing the streaming media format header. For example, the data URL allows a multipurpose Internet mail extension (MIME) tag type to be specified. The MIME type is used to identify the type of content that is contained within the data URL. In one embodiment, the MIME type "application/vnd.ms.wms-hdr.asfv1" identifies that a data URL contains a streaming media format file header.

In the SDP embodiment, the software of the invention identifies the header attribute 504 as a program parameters URL (e.g., PGMPU) extension attribute whose value is a URL that can be used to obtain the streaming media header or other information about the multimedia presentation. The header attribute 504 appears in the session description section 512 of SDP. An exemplary syntax is as follows a=pgmpu:<URL> where <URL> is replaced with a URL for the additional information (e.g., the header). Although the syntax allows any kind of URL, one implementation supports the use of the data URL. An example of the header attribute 504 with the data URL referencing the streaming media header follows.

a=pgmpu:data:application/vnd.ms.wms-hdr.asfv1;
base64,MCaydY5mzxGm2QCqAGL0b . . . (Base64 data truncated for brevity)

In this example, the encapsulated header is the ASCII string beginning with MCayd . . .

Each media description field stores a stream identifier attribute. For example, the media description field 514 stores stream identifier attribute #1 508, and the media description field 516 stores stream identifier attribute #M 510. In an SDP embodiment, the software of the invention identifies the stream identifier attributes 508, 510 as a STREAM extension attribute in each of the media description fields 514 through 516. A value for the stream attribute 508, 510 represents a stream identifier for one or more of the media streams associated with the media description field 514, 516 and stored in the streaming media format file. An exemplary syntax is as follows.

a=stream:<Stream ID> where <Stream ID> is replaced with the stream identifier of the stream in the streaming media format file that corresponds to the media that is described in the SDP media description section (e.g., media description 514 or media description 516). The stream attribute 508, 510 establishes a mapping between the stream identifier and the URL in a control attribute of the media description field 514, 516. If the streaming media format is ASF, the stream attribute 508, 510 gives the numerical ASF stream identifier of a stream identified in the ASF header 504. The stream attribute 508, 510 is used to provide a mapping between a media description field and a stream in the streaming media format file. An example of the control attribute and the stream attribute 508, 510 follow.

a=control:rtsp://server/presentation.wmv/audio
a=stream:1

In this example, when these attributes appear in the media description part 514, 516 of the session description message 502, it means that the URL "rtsp://server/presentation.wmv/audio" can be used in an RTSP SETUP request to select the delivery of the streaming media format stream with stream ID #1.

The data referred to by these attributes is accessed through a URL, which is provided as the value of the attribute. The server 104 supports URLs with the data URL scheme. Such URLs have the property that the data to be conveyed is stored inline in the URL itself. The data URL scheme is presently defined in the IETF RFC 2397, the entire disclosure of which is incorporated herein by reference.

Content Description List

With further reference to FIG. 4, the session description field stores the list 506 of one or more content description attributes 522, 524 such as content description attribute #1 through content description attribute #N. Each content description attribute 522, 524 includes one or more name-value pairs. For example, content description attribute 522 stores name-value pair #1 526 through name-value pair #X 528. In addition, content description attribute 524 stores name-value pair #1 530 through name-value pair #Y 532. In FIG. 2 and FIG. 4, the exemplary values for M, N, X, and Y are integer values. A value for each content description attribute 522, 524 references at least one metadata item relating to the media streams (e.g., via a URL). In one embodiment, the metadata items are stored as the name-value pairs 526, 528, 530, 532. For example, the metadata item may represent an encoded bit rate for the media stream. In another example, the content description attribute (e.g., content description attribute 522) represents a language, and wherein at least one name-value pair (e.g., name-value pair 526) for the content description attribute references at least one metadata item related to the language.

In one embodiment, each content description attribute 522, 524 in the content description list 506 is a collection of name-value pairs for a specific language. Names are represented as strings in a 16-bit character encoding standard such as the Unicode character set (e.g., Unicode strings or numbers).

In an alternative embodiment (not shown), the content descriptions are stored in the appropriate media description part of the session description message 502.

Encapsulation

While the following section describes an exemplary process for encapsulating the content description list 506 for embedding into the session description field 512 of a session description message 502, the process is also applicable to encapsulating the streaming media format header in the header attribute 504. Those skilled in the art will note that the process for encoding described herein is merely exemplary, and that other methods of encoding exist and are contemplated by the inventors to be within the scope of the invention.

Figure 5:
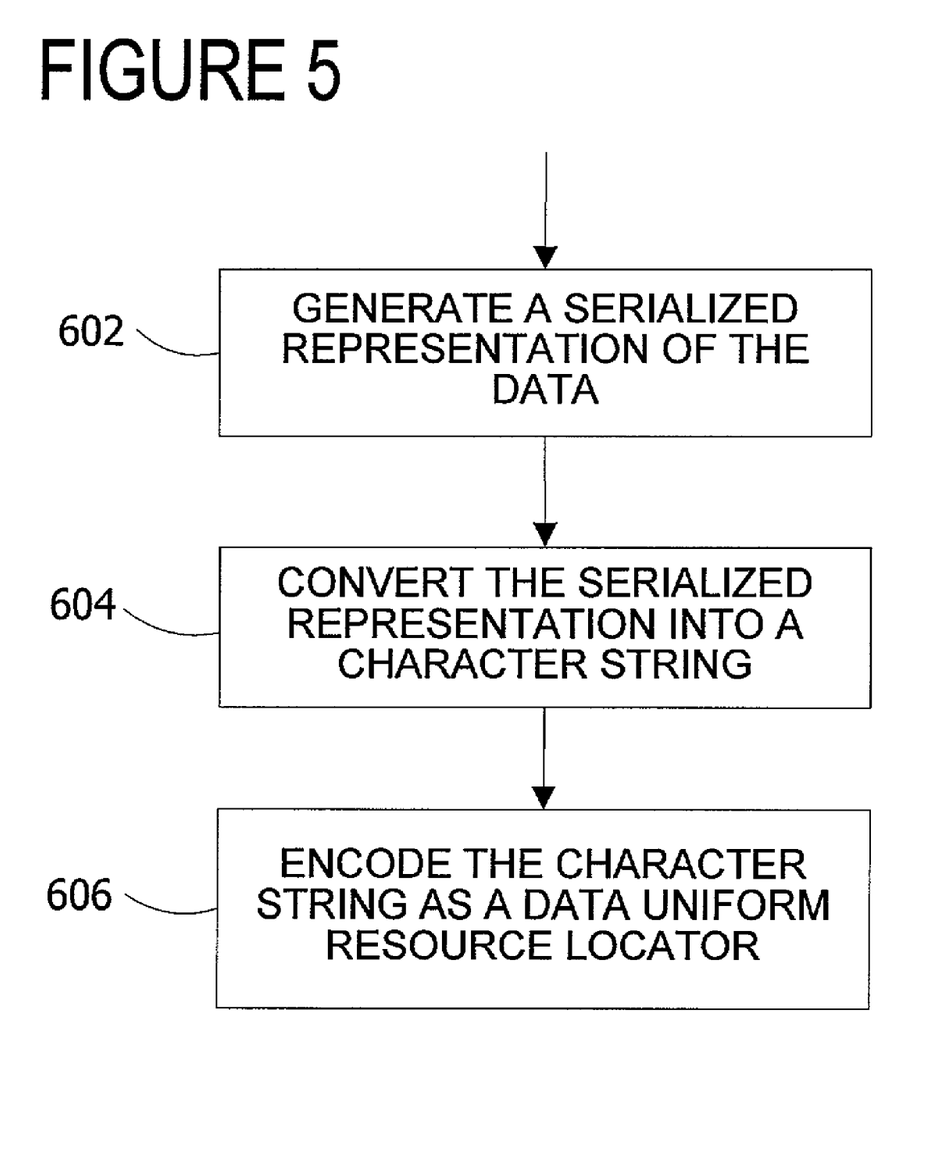
FIG. 5 is an exemplary flow chart illustrating encapsulation of data into a description message.

Referring next to FIG. 5, the exemplary process of encoding the content description list 506 into the description message 502 can be divided into serialization, UTF-8 encoding, and conversion into a data URL. The software of the invention generates or otherwise creates a serialized representation at 602 of the contents of a data structure such as the content description list 506. That is, everything in the content description list 506 is written to a contiguous buffer so that it can readily be converted into a data URL. For example, each name-value pair of a content description is serialized as follows: <name length>,<name>,<type>,<value length>,<value> where the <name length> field stores a number indicating the number of characters in the <name> field. The <name> field stores a string giving the name of the metadata item. The <type> field stores a numerical value that identifies whether the value of the metadata item should be interpreted as any form of string (e.g., binary or character) or as a number. For example, the value of the metadata item may be a binary string representing a graphic image. The <value length> field stores a number indicating the number of characters in the <value> field. The <value> field stores either a string or a number as the value of the metadata item. The value of the <type> field determines how to interpret the <value> field. Multiple name-value pairs in a content description are separated by a comma character (","). In one embodiment, the following table lists valid values for the <type> field:

| Value of <type> field | Interpretation of <value> field |
| --- | --- |
| 3 | Number |
| 8 | String |
| 19 | Number |
| 31 | String |

In this embodiment, no other values for the <type> field are valid. If the client 106 encounters a <type> field with an invalid value, the client 106 will skip that metadata item. Those skilled in the art will note that the values and interpretations listed in the above table are merely exemplary. It is contemplated by the inventors that the invention is operable with any set of values and interpretations.

The invention includes exemplary formatting for the serialized content description. Metadata items appear in any order in a serialized content description, with the following exception: The <name> field of the first serialized metadata item in each content description has the value "language". Furthermore, the value of the <type> field of this metadata item is "8" or "31". The value of the <value> field of this metadata item is the language tag in the IETF RFC 1766, the entire disclosure of which is incorporated herein by reference, that identifies the language of all other metadata items in the content description. If no language tag is available or if the metadata items are considered to be language independent, the value of the <value> field may be empty.

Multiple content descriptions are separated by a carriage return followed by line feed (CRLF) character sequence. In other words, if a metadata item is followed by a CRLF, it indicates the end of the current content description and the start of a new content description. An example of a serialized content description list 506 with two content descriptions follows (CRLF character sequences are not visible).

8,language,31,5,en-us,5,title,31,5,Hello
8,language,31,2,es,5,title,31,4,Hola

The second part of the exemplary encoding process converts at 604 the serialized representation of the data (e.g., the content description list 506) into a character string from the Unicode character set to the UTF-8 character set. UTF-8 is a reversible encoding of Unicode that yields a more compact representation of the Unicode string, if the string contains western European characters. Also, UTF-8 characters are commonly used in URLs, while Unicode characters are not. UTF-8 is described in the IETF RFC 2279, the entire disclosure of which is incorporated herein by reference.

The third part of the process converts or otherwise encodes the serialized content description list at 606 into a data URL. An exemplary MIME type "application/x-wms-contentdesc" indicates that the data URL includes a serialized content description list. In one embodiment, Base64 encoding is not applied to the serialized content description list, but any characters that cannot safely appear in a URL need to be escaped using a hex-escape mechanism for URLs.

The data URL embodying the content description list 506 is inserted into the session description field 512 using an extension attribute or directive. In one embodiment, an extension attribute identifier such as PGMPU used to convey the streaming media format file header is utilized. The MIME type in the data URL is used to distinguish between the two usages of the PGMPU extension attribute. An example of the resulting SDP syntax after the content description list 506 has been inserted into the description message 502 follows as a single line in SDP.

a=pgmpu:data:application/x-wms-contentdesc,8,language,31,5,en-us,5,title,31,5, Hello %0D %0A8,language,31,2,es,5,title,31,4,Hola Alternatively, the data URL embodying the content description list 506 is inserted into the session description field 512 using an extension attribute or directive other than PGMPU. In such an embodiment, the MIME type in the data URL is not needed.

Although UTF-8 encoding is shown separately from serialization for convenience in FIG. 5, in one embodiment, the UTF-8 encoding is part of the serialization. That is, each "name" or "value" is first UTF-8 encoded and then added to the serialized representation. In this embodiment, the <name length> and <value length> fields, for example, already reflect the length of the UTF-8 encoded names and values, respectively.

Exemplary Operating Environment

Figure 6:
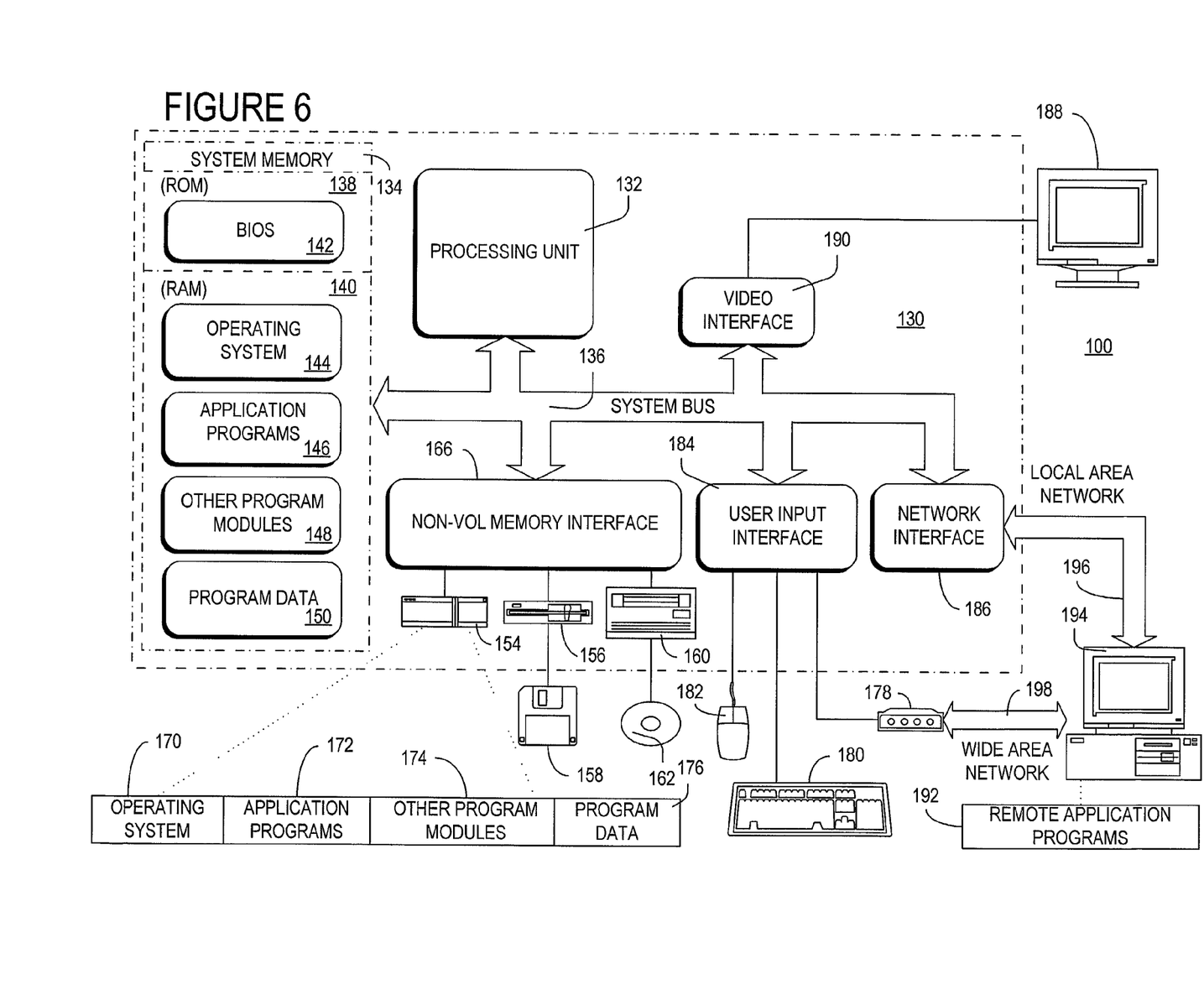
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other data communication networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184 or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, a server computer such as computer 130 or media server 104 executes computer-executable instructions such as those illustrated in FIG. 2 to receive a description request from the client 106 to describe the content and to transmit the description message 502 via a description protocol to the client 106 in response to the received description request. The description message 502 includes the header encapsulated therein. The server computer further executes instructions to receive at least one of the stream identifiers from the client 106 where the received stream identifiers correspond to the media streams selected by the client 106 for rendering. The server computer further executes instructions to deliver the selected media streams to the client 106 in response to the received stream identifiers.

In operation, a client computer such as computer 130 or client 106 executes computer-executable instructions such as those illustrated in FIG. 2 to transmit a description request to the server 104 for a description of the content and receive a description message 502 from the server 104 via a description protocol in response to the transmitted description request. The description message 502 includes the header encapsulated therein. The client computer further executes instructions to select one or more of the media streams for rendering and transmit the stream identifiers corresponding to the selected media streams to the server 104 to notify the server 104 of the selected media streams. The client computer further executes instructions to request delivery of the selected media streams from the server 104, receive the delivered, selected media streams, and render the media streams.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

The following contains excerpts from an SDP content description that is returned to clients in response to a DESCRIBE request. The SDP description indicates the path for the content file, URLs for audio and video streams, and associated standard and dynamic streams.

```
v=0
o=SYSTEM       2001032617414702       00
    200103261741470200 IN IP4 127.0.0.1
s=<No Title>
c=IN IP4 0.0.0.0
b=AS:5
a=maxps:900
t=0.0
a=control:rtsp://MyServer.MyDomain.com/welcome.asf/
a=etag:{6CAE8AA4-1866-A24D-344E-
    3CF22C3894A7}
a=range:npt=0.000-110.474
a=recvonly
a=pgmpu:data:application/x-wms-contendesc,
    Copied%20MetaData%20From       %20Playlis
    %20File=1%0D%0A
:
:
m=audio 0 RTP/AVP 96 97 98
b=AS:7
b=RS:0
b=RR:0
a=rtpmap:96 x-asf-pf/1000
a=rtpmap:97 parityfec/1000
a=fmtp:97 audio/fec97 24 1
a=rtpmap:98 wms-fec/1000
a=fmtp:98 audio/fec98 24 1
a=control:audio
a=stream:1
m=application 0 RTP/AVP 96
b=RS:0
b=RR:0
a=rtpmap:96 x-wms-rtx/1000
a=control:rtx
a=stream:65536
m=video 0 RTP/AVP 96 97 98
b=AS:45
b=RS:0
b=RR:0
a=rtpmap:96 x-asf-pf/1000
a=rtpmap:97 parityfec/1000
a=fmtp:97 video/fec97 24 1
a=rtpmap:98 wms-fec/1000
a=fmtp:98 video/fec98 24 1
a=control:video
a=stream:2
```

What is claimed is:

1. A method for streaming content encoded in a streaming media format to at least one client as one or more media streams via a streaming protocol, said method being performed by a server and comprising:

generating a serialized representation of one or more stream identifiers, each of the stream identifiers corresponding to at least one of the media streams, wherein at least two of the stream identifiers correspond to media streams intended for mutually exclusive rendering by the client;

converting the serialized representation of the stream identifiers into a character string;

receiving a description request from the client to describe the content;

transmitting a description message via a description protocol to the client in response to the received description request, said description message comprising a header that includes the character string, wherein the header is encapsulated within the description message;

receiving only one of the stream identifiers corresponding to the media streams intended for mutually exclusive rendering from the client, said received stream identifier corresponding to the media stream selected by the client for rendering wherein the client selects only one of the stream identifiers corresponding to a media stream intended for mutually exclusive rendering based on a configuration of the client; and delivering the selected media stream intended for mutually exclusive rendering to the client via the streaming protocol in response to the received stream identifier.

2. The method of claim 1, further comprising receiving a playback request from the client for delivery of the selected media streams, wherein delivering comprises delivering the selected media streams to the client in response to the received playback request.

3. The method of claim 1, wherein said transmitting comprises transmitting the description message to the client wherein the description message comprises a list of one or more content descriptions describing the media streams.

4. The method of claim 1, wherein said delivering comprises delivering the selected media streams to the client in an Advanced Streaming Format.

5. The method of claim 1, wherein said transmitting comprises transmitting the description message to the client via a session description protocol.

6. The method of claim 1, further comprising controlling said delivering via a real-time streaming protocol.

7. The method of claim 1, wherein said delivering comprises delivering the selected media streams to the client via a real-time transport protocol.

8. The method of claim 1, wherein said delivering comprises delivering the selected media streams to the client from one or more computer-readable media.

9. The method of claim 1, wherein said delivering comprises forwarding the selected media streams to the client from a server.

10. The method of claim 1, wherein one or more computer-readable media have computer-executable instructions for performing the method of claim 1.

11. The method of claim 1, wherein converting comprises encoding the serialized representation as a data uniform resource locator.

12. The method of claim 1, wherein generating a serialized representation comprises storing the data in a contiguous buffer.

13. The method of claim 1, wherein said generating comprises generating a serialized representation of the data conforming to a UTF-8 character encoding standard.

14. The method of claim 1, wherein said serialized representation comprises one or more characters representing the data, and wherein said converting comprises escaping a plurality of the characters.

15. The method of claim 1, wherein said data comprises one or more characters, and wherein said generating comprises escaping a plurality of the characters.

16. A method for receiving content streamed from a server via a streaming protocol as a plurality of media streams, said content being encoded in a streaming media format said method being performed by a client and comprising:

transmitting a description request to the server for a description of the content;

receiving a description message from the server via a description protocol in response to the transmitted description request, said description message comprising a header encapsulated therein, said header including a character string comprising a serialized representation of a plurality of stream identifiers, each of said plurality of stream identifiers corresponding to at least one of the media streams;

selecting one or more of the media streams for rendering, wherein at least two of the stream identifiers correspond to media streams intended for mutually exclusive rendering;

transmitting the stream identifiers corresponding to the selected media streams to the server to notify the server of the selected media streams, wherein the client selects only one of the stream identifiers corresponding to at least two media streams intended for mutually exclusive rendering; based on a configuration of the client, said confirmation of the client including one or more of the following: a language of the client, a connection bandwidth of the client, and an ability to render video;

requesting delivery of the selected media streams from the server via the streaming protocol;

receiving the delivered, selected media streams; and rendering the media streams.

17. The method of claim 16, further comprising selecting at least one of the content descriptions that relate to the selected media streams.

18. The method of claim 16, wherein receiving the delivered, selected media streams comprises receiving the delivered, selected media streams in an Advanced Streaming Format.

19. The method of claim 16, wherein receiving the description message from the server comprises receiving the description message from the server via a session description protocol.

20. The method of claim 16, wherein said requesting comprises requesting delivery of the selected media streams from the server, said delivery occurring via a real-time transport protocol.

21. The method of claim 16, wherein said requesting comprises requesting delivery of the selected media streams from the server via a real-time streaming protocol, wherein said real-time streaming protocol controls delivery of the selected media streams.

22. The method of claim 16, wherein said transmitting the stream identifiers comprises transmitting uniform resource locators corresponding to the selected media streams to the server to notify the server of the selected media streams.

23. The method of claim 16, wherein one or more computer-readable media have computer-executable instructions for performing the method of claim 16.

* * * * *